(12) United States Patent
Yoshida

(10) Patent No.: US 6,882,598 B2
(45) Date of Patent: Apr. 19, 2005

(54) DISK REPRODUCTION APPARATUS AND METHOD FOR USE IN SAME

(75) Inventor: Tomoaki Yoshida, Hino (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 495 days.

(21) Appl. No.: 09/977,990

(22) Filed: Oct. 17, 2001

(65) Prior Publication Data

US 2002/0044502 A1 Apr. 18, 2002

(30) Foreign Application Priority Data

Oct. 18, 2000 (JP) ........................................ 2000-318509

(51) Int. Cl.[7] ............................................. G11B 7/085
(52) U.S. Cl. ................................ 369/30.06; 369/30.1
(58) Field of Search .............................. 369/30.06, 30.1

(56) References Cited

U.S. PATENT DOCUMENTS 6,034,925 A * 3/2000 Wehmeyer ............... 369/30.28
6,131,129 A * 10/2000 Ludtke et al. ................. 710/5
6,157,597 A * 12/2000 Fleming, III ............... 369/30.3
6,356,971 B1 * 3/2002 Katz et al. .................. 710/301
6,560,403 B1 * 5/2003 Tanaka et al. ................ 386/95

* cited by examiner

*Primary Examiner*—A M Psitos
(74) *Attorney, Agent, or Firm*—Eric J. Robinson; Robinson Intellectual Property Law Office, P.C.

(57) ABSTRACT

A user can designate a track for program reservation of a Carousel player capable of loading both a CD and DVD-Audio, smoothly irrespective of the type of a disk. It is first checked whether a track corresponding to the disk number entered by a user is a track of CD or DVD-Audio. If the track is a track of a CD, after the disk number input, the user is immediately requested to enter a track number, whereas if the track is a track of a DVD-Audio, the user is requested to enter a group number and then the user is requested to enter a track number.

8 Claims, 3 Drawing Sheets

DISK REPRODUCTION APPARATUS AND METHOD FOR USE IN SAME

BACKGROUND OF THE INVENTION

1. Field of the Invention

The present invention relates to a disk reproduction apparatus such as a Carousel player capable of accommodating a plurality of disks such as CD and DVD in disk mount areas and randomly accessing a desired track or the like of a desired disk in a disk mount area.

2. Description of the Related Art

In a general Carousel player, a tray is moved along the horizontal direction so that the tray can be pulled out of the housing of a player main body or entered into the housing. A rotary table is rotatively mounded on the tray around a vertical line and a plurality of disks, e.g., five disks are placed on the rotary table at an equal angle interval around the rotation axis. Each disk mount area of the rotary disk has a U-character shaped recess having a predetermined size and opening in the radial direction of the rotary table. A lower predetermined surface of the disk in the mount area is exposed downward from the rotary table via the U-character shaped recess. A traverse can move up and down. At the up-position, it raises and passed through the U-character shaped recess to pressure-contact a partial exposed surface of the disk and reproduce the disk. The Carousel player houses a plurality of disks including CD and DVD-Audio (Digital Video Disk—Audio) and randomly accesses a desired track of a desired housed disk to reproduce the track. DVD-Audio has the two-layerd hierarchical structure for storing tracks. Namely, an upper layer called a group and a lower layer called a track. The same track can exist in different groups. Therefore, when a user designates a track for program reproduction, the group number is first designated and then the track is designated.

When a user designates a track to be registered for program reproduction by CD, a conventional Carousel player displays an input frame for a group number similar to DVD-Audio. A user not accustomed to the player may be confused.

SUMMARY OF THE INVENTION

It is an object of this invention to provide a disk reproduction apparatus capable of solving the above-described problem.

This invention is directed to a disk reproduction apparatus capable of accommodating a plurality of disks in disk mount areas and randomly accessing any track in any disk in the disk mount areas. And, this invention's disk reproduction apparatus is constituted so as to comprise means for discriminating whether a track corresponding to a disk number entered by a user is a track of a first type of disk or a second type disk, means for requesting the user to enter a track number immediately after entering the disk number, when the discriminated track is a track of the first type of disk, and means for requesting the user to enter a group number and then requesting to enter a track number after the group number is entered, when the discriminated track is a track of the second type disk.

According to a first aspect of this invention, a disk reproduction apparatus is provided a disk reproduction apparatus having a plurality of disk mount areas each accommodating a disk designated by a disk number corresponding to the disk mount area, a plurality type of disks being accommodated in the disk mount areas, each disk having a reproduction designation unit which is a minimum unit capable of being randomly accessed in response to a reproduction instruction, a method of designating the reproduction designation unit of each disk being different for each disk type, each reproduction designation unit being able to be reproduced by randomly accessing the reproduction designation unit of each disk accommodated in the disk mount area, wherein when a user designates a predetermined reproduction designation unit of a predetermined disk, the disk type is judged from a disk number designated by the user, and the user is required to enter data in an input item order corresponding to the disk type.

The disk reproduction apparatus includes at least a Carousel player. It is assumed that the disk type includes a CD, a DVD-Audio, a DVD-Video (Digital Video Disk—Video) and other optical disks having the same diameter as CD and the like. The reproduction designation unit is a Track for CD and DVD-Audio, and a Chaper for DVD-Video. When a user designates a predetermined reproduction designation unit of a predetermined disk, the user designates the reproduction designation unit for registration of program reproduction, the user designates a track to be randomly accessed, or the user designates other subjects. Designating the reproduction designation unit by a user is generally performed by a visual display guidance in a display window. If two types of disks, CD and DVD-Audio are mounted on the disk reproduction apparatus, the input item order corresponding to the disk type is as follows. (a) Three input frames for a disk number, a group number and a track number are always displayed in an input request window for a user. In the case of CD, when a user input a disk number, a cursor indicating the input frame is moved to the track number input frame or the displayed input item name "Track" is highlighted. In the case of DVD-Audio, when the user input a disk number, the cursor indicating the input frame is moved to the group number input frame or the displayed input item name "Group" is highlighted. After the group number is input, the cursor may be moved to the track number input frame or the input item name "Track" may be highlighted. Alternatively, (b) in the case of CD, the group number input frame is not displayed in the input request window after a user inputs a disk number, but only the track number input frame is displayed. In the case of DVD-Audio, the group number input window and track number input frame are displayed i the input request window after a user inputs a disk number. When a user designates the reproduction designation unit, although the input data is generally a group number or a track number, the input data is not limited only to a number but it may be a character or the like.

For example, if a disk corresponding to the disk number designated by a user is a CD, the user is immediately requested to input a track number after the disk number without being requested to input a group number or the like. A user is requested to enter data in the input item order corresponding to the disk type, i.e., the user is not requested to enter data corresponding to the input item of another disk type different from the disk type corresponding to the designated disk number. Therefore, the user can smoothly and efficiently designate the reproduction designation unit.

According to a second aspect of this invention, in the disk reproduction apparatus according to the first aspect, the input item order corresponding to the disk type may be predetermined for each disk type and related to a hierarchical structure storing the reproduction designation unit of each disk.

If a disk is a CD, the disk hierarchical structure has one level, whereas if a disk is a DVD-Audio or DVD-Video, the disk hierarchical structure has two levels.

In designating the reproduction designation unit such as a track, items are sequentially selected from the upper level to the lower level and lastly to the lowermost level reproduction designation unit. Therefore, the input item order corresponding to the disk type is predetermined for each disk type and related to the hierarchical structure storing the reproduction designation unit of each disk. Namely, a CD has one level so that the track number is requested to be input, whereas a DVD-Audio has two levels so that the group number and track number are requested to be sequentially input. A user can therefore designates the reproduction designation unit smoothly.

According to a third aspect of this invention, in the disk reproduction apparatus according to the first or second aspect of the invention, an input item name which the user is requested to input in the input item order may be an item name of a hierarchical structure of each disk.

The item names of the hierarchical structure of each disk are the group and track in the order from the upper level item name in the case of DVD-Audio, and the title and chapter in the order from the upper item name in the case of DVD-Video.

In designating the reproduction designation unit such as a track, items are sequentially selected from the upper level to the lower level and lastly to the lowermost level reproduction designation unit. The user is requested to input an item name of the hierarchical structure of each disk in the input item order. A user can definitely confirm the disk type and designate data of each input item name smoothly.

According to a fourth aspect of this invention, in the disk reproduction apparatus according to the second or third aspect of the invention, if the disk type cannot be known, the user is requested to input data in the input item order corresponding to the hierarchical structure of a disk having the maximum number of levels of the hierarchical structure.

If the disk type is not known, a user is requested to input data in accordance with a disk required to enter the maximum number of inputs, i.e., the maximum number of levels. In this manner, necessary inputs can be ensured without any skip of inputs. If a user knows the disk type although the disk reproduction apparatus does not know it, unnecessary input items are skipped by the user so that the reproduction designation unit can be designated speedily.

According to a fifth aspect of this invention, in the disk reproduction apparatus according to any one of the second to fourth aspects, the hierarchical structure of each disk may be detected from management information which is first read from the disk, and the read hierarchical structure may be stored.

Prior to reproduction of the reproduction designation unit of a disk, management information (called "TOC" in the case of CD) is once read from the disk. This read management information is stored and used at each reproduction, until the disk is dismounted from the apparatus. The disk hierarchical structure and/or hierarchical item names can be know from the management information. Therefore, the disc hierarchical structure is detected from the management information when it is first area, and thereafter stored. Thereafter, each time the reproduction designation unit is designated, the input item order and input item name can be detected efficiently from the stored hierarchical structure.

According to a sixth aspect of this invention, in the disk reproduction apparatus according to the fifth aspect of the invention, the stored hierarchical structure of each disk may be erased when the disk together with the disk mount area accommodating the disk is exposed.

When a user exchanges a disk corresponding to each disk number, the disk mount area accommodating the disk is usually exposed to the external.

When the disk mount area is exposed, the stored hierarchical structure of the disk is erased. In this case, a miss of the input item order or input item name to be caused by an misjudged disk type can be avoided.

According to a seventh aspect of this invention, in the disk reproduction apparatus according to the first to fifth aspects of the invention, when a user designates a predetermined reproduction designation unit of a predetermined disk, the user may designate the reproduction designation unit for registration of program reproduction.

DETAILED DESCRIPTION OF THE EMBODIMENT

An embodiment of the invention will be described with reference to the accompanying drawings.

Figure 1:
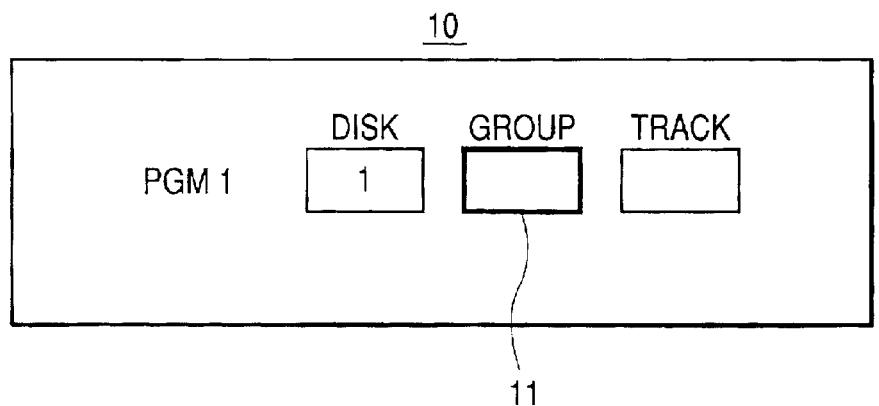
FIG. 1 is a diagram showing a first example of a program reservation window displayed on a display unit of a Carousel player.

FIG. 1 is a diagram showing a first example of a program reservation window displayed on a display unit 10 of a Carousel player. In the Carousel player used in this embodiment of the invention, a tray is moved along the horizontal direction so that the tray can be pulled out of the housing of a player main body or entered into the housing. A rotary table is rotatively mounded on the tray around a vertical line and a plurality of disks, e.g., five disks are placed on the rotary table at an equal angle interval around the rotation axis. Each disk mount area of the rotary disk has a U-character shaped recess having a predetermined size and opening in the radial direction of the rotary table. A lower predetermined surface of the disk in the mount area is exposed downward from the rotary table via the U-character shaped recess. A traverse can move up and down. At the up-position, it raises and passed through the U-character shaped recess to pressure-contact a partial exposed surface of the disk and reproduce the disk. The display unit 10 is mounted on the Carousel player main body. In FIG. 1, PGM1 indicates that a track is reserved which is reproduced as the first reproduction order of program reproduction. Each time one track is registered, the display on the display unit changes to PGM2, PGM3, . . . In addition to the reproduction order, words Disk, Group and Track are displayed in this order in a row. Under these words, input frames for a disk number, a group number and a track number are disposed. A user enters numbers by using ten-keys of a remote controller. The input frame in which the user is requested to enter a number is highlighted as indicated at 11. The example shown in FIG. 1 indicates that the user entered "1" as the disk number and the disk having the disk number "1" is a DVD-Audio. Therefore, the group number input frame is highlighted as indicated at 11. If a disk corresponding to the disk number entered by a user is a DVD-Audio, after the group number is entered by the user, the track number input frame is highlighted to request the user to enter a track number. If a disk corresponding to the disk number entered by a user is a CD, the group number input frame is not highlighted but the track number input frame is highlighted so that the user enters a track number in the track number input frame.

The type of each disk corresponding to a disk number may be checked from stored data which is obtained by making a user manually enter a disk type when the disk is placed in the mount area of the rotary table. The disk type may also be checked by using the techniques disclosed in JP-A-10-334547 and JP-A-11-232768.

Figure 2:
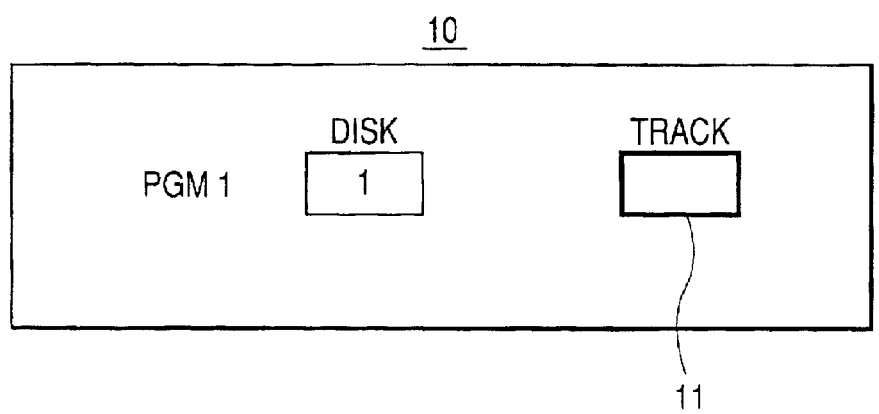
FIG. 2 is a diagram showing a second example of a program reservation window displayed on the display unit of the Carousel player.

FIG. 2 is a diagram showing a second example of a program reservation window displayed on the display unit 10 of the Carousel player. In the program reservation window shown in FIG. 1, if a disk corresponding to the disk number entered by in the disk number input frame is a CD, the group number input frame is not highlighted but the track number input frame is highlighted so that the user enters a track number in the track number input frame. In the example shown in FIG. 2, if a disk corresponding to the disk number entered by in the disk number input frame is a CD, the group number input frame is erased to leave only the disk number input frame and track number input frame and upper words and highlight the track number input field as indicated at 11. With the program reservation window shown in FIG. 2, a user can definitely confirm that the disk having the disk number selected by the user is a CD.

Figure 3:
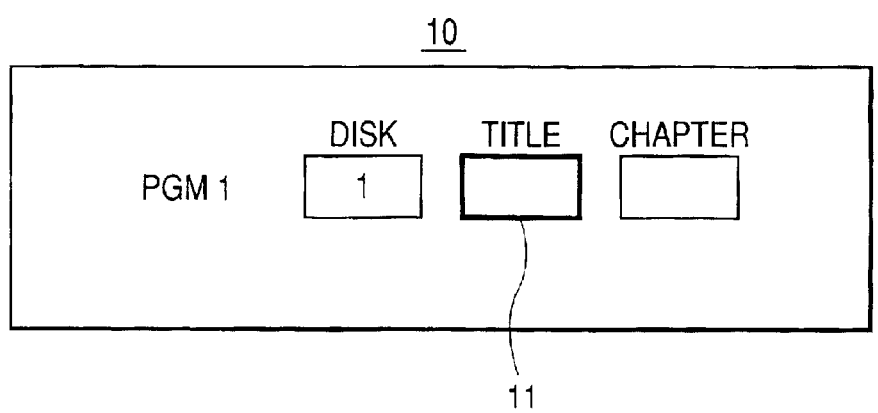
FIG. 3 is a diagram showing an example of a program reservation window displayed on the display unit when a disk corresponding to the disk number designated by a user is a DVD-Video.

FIG. 3 is a diagram showing an example of a program reservation window displayed on the display unit when a disk corresponding to the disk number designated by a user is a DVD-Video. When a disk number is input, the program reservation window shown in FIG. 1 is displayed and the disk number input frame is highlighted as indicated at 11. After a user enters a disk number in the disk number input frame and it is judged that the disk corresponding to the disk number is a DVD-Audio, the program reservation window shown in FIG. 1 continues to be displayed and the group number input frame is highlighted. If the disk is a CD, the program reservation window shown in FIG. 2 is displayed and the track number input frame is highlighted as indicated at 11, whereas if the disk is a DVD-Video, the program reservation window shown in FIG. 3 is displayed. As shown in FIG. 3, in addition to Disk, words Title and Chapter are displayed in this order in a row. Under these words, input frames for a disk number, a title number and a chapter number are disposed. The frame in which a user is requested to enter a number, is highlighted as indicated at 11. Both DVD-Video and DVD-Audio have a two-layer hierarchical structure. Although the program reservation window shown in FIG. 1 may be used even if a disk corresponding to the disk number selected by a user is a DVD-Video. However, since the name of each level of DVD-Video is different from that of DVD-Audio, the program reservation window shown in FIG. 3 is used. A user can definitely confirm that the disk corresponding to the disk number selected by the user is a DVD-Video. It is also easy to make a user select Chapter. Chapter is a reproduction designation unit of DVD-Video.

Figure 4:
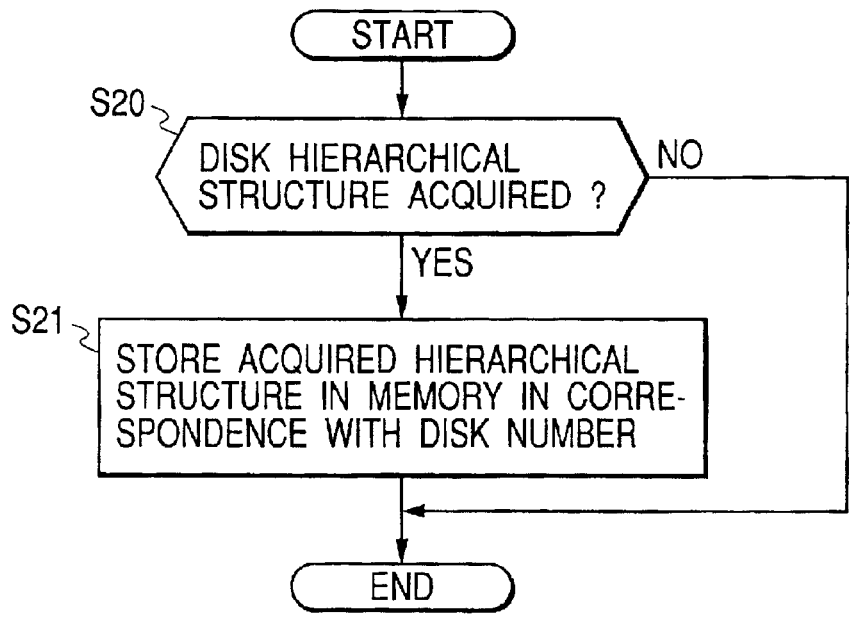
FIG. 4 is a flow chart illustrating the operation of a program which operates to store the hierarchical structure of disks placed in mount areas corresponding to respective disks.

FIG. 4 is a flow chart illustrating the operation of a program which operates to store the hierarchical structure of disks placed in mount areas corresponding to respective disks. At S20 it is judged whether the disk hierarchical structure is acquired. If this judgment is YES, the flow advances to S21 whereat the acquired hierarchical structure is stored in a memory in correspondence with the disk number. If the judgement at S20 is NO, this program is terminated. The disk hierarchical structure can be detected from disk management information which is read, for example, when some track of the disk is reproduced after the disk is placed in the mount area.

Figure 5:
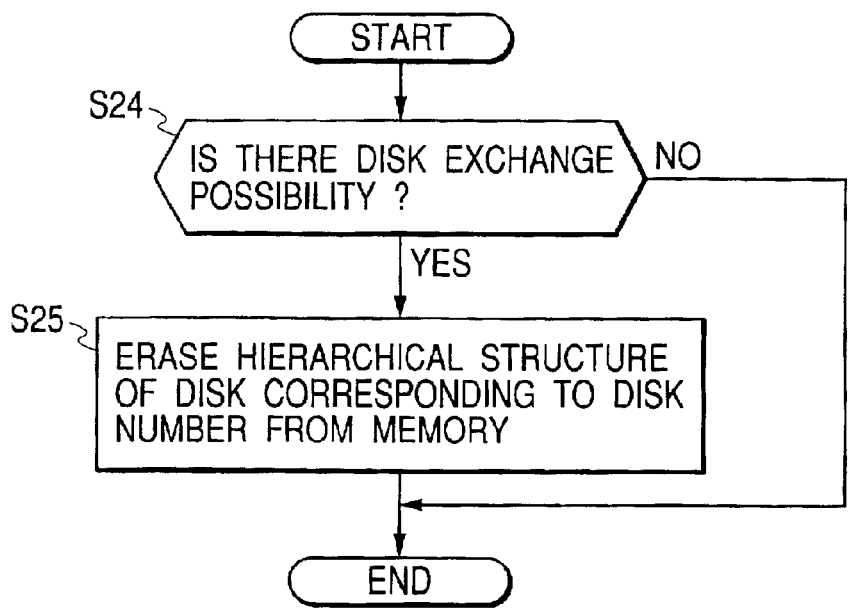
FIG. 5 is a flow chart illustrating the operation of a program which operates to erase the hierarchical structure stored in a memory by the program shown in FIG. 4.

FIG. 5 is a flow chart illustrating the operation of a program which operates to erase the hierarchical structure stored in the memory by the program shown in FIG. 4. It is judged at S24 whether there is a possiblity that a disk is exchanged. If this judgement is YES, the flow advances to S25 whereat the disk number of the disk is detected and the hierarchical structure stored in the memory in correspondence with the disk number is erases. If the judgement at S24 is NO, this program is terminated. The possibility that a disk is exchanged is, for example, a case that the tray accommodating a disk is protruded from the Carousel player and the disk together with the tray are exposed to allow the disk to be exchanged. In this case, although the user generally exchanges the disk with another disk, the user may not exchange the disk even if the tray is protruded. The term "possibility" is therefore used to include both the cases.

Figure 6:
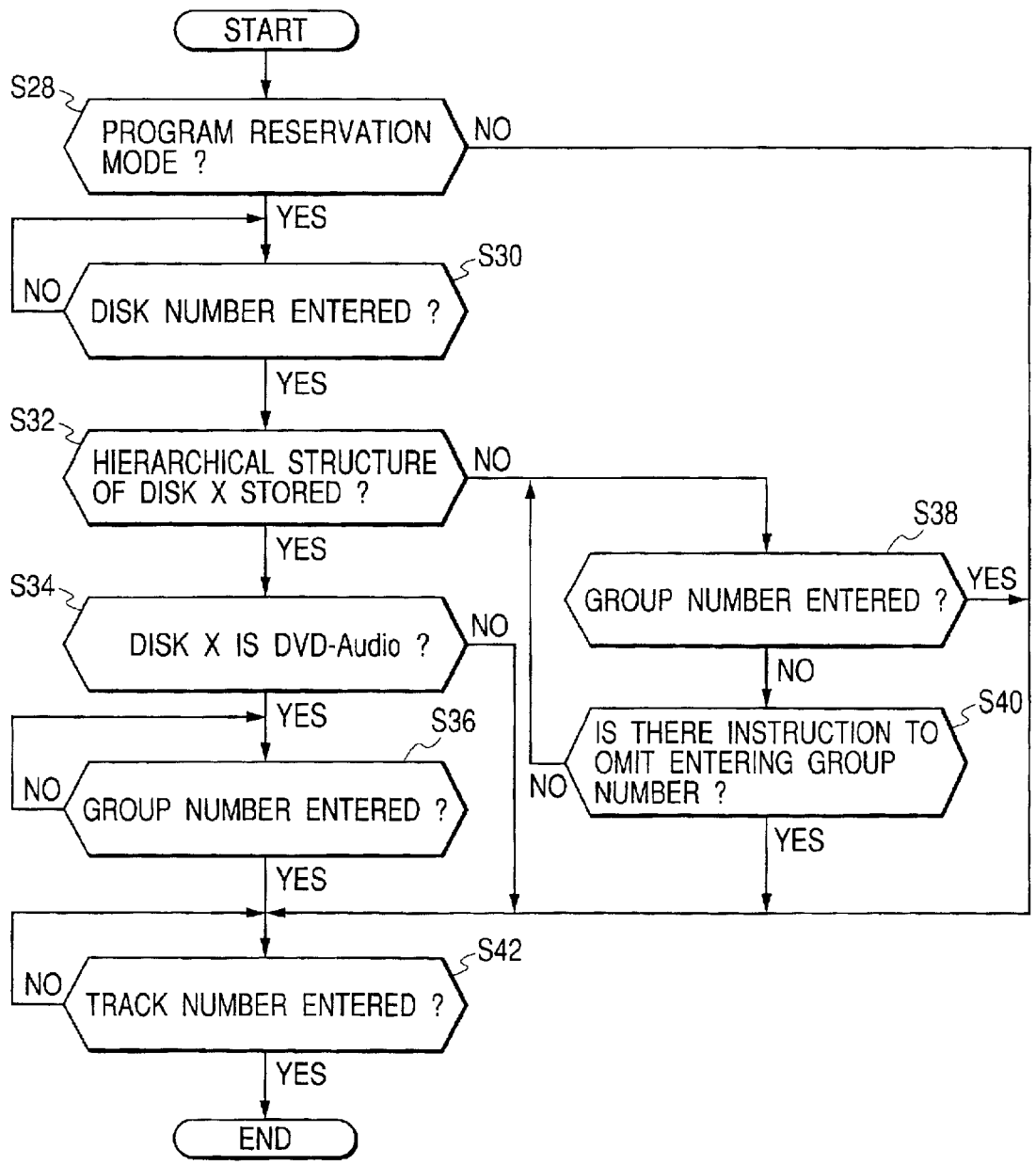
FIG. 6 is a flow chart illustrating the operation of a program for program reservation.

FIG. 6 is a flow chart illustrating the operation of a program for program reservation. It is judged at S28 whether an operation mode is a program reservation mode. If this judgement is YES, the flow advances to S30, whereas if it is NO, this program is terminated. It is judged at S30 whether a user enters a disk number, and if the user enters the disk number, the flow advances to S32. It is judged at S32 whether the hierarchical structure of the disk (herinafter called disk X) corresponding to the disk number entered at S30 can be acquired, i.e., whether the hierarchical structure of the disk X is stored in the memory. If this judgement is YES, the flow advances to S34, whereas if it is NO, the flow advances to S38. At S34 it is judged whether the disk X is a DVD-Audio. If this judgement is YES, i.e., if the disk X is a DVD-Audio, the flow advances to S36, whereas if it is NO, i.e., the disk X is a CD, the flow advances to S42. At S36 it is judged whether the group number is entered. After the group number is entered, the flow advances to S42. At S38 it is judged whether the group number is entered. If this judgement is YES, the flow advances to S42, whereas if it is NO, the flow advances to S40. At S40 it is judged whether there is an instruction to omit inputting the group number. If this judgement is YES, the flow advances to S42, whereas if it is NO, the flow returns to S38. At S42, the program is terminated after the user enters the track number. As above, if the disk hierarchical structure can be acquired, the input guide is provided in the input item order related to the hierarchical structure to request a user input. If the disk hierarchical structure cannot be acquired as yet, the input guide is provided in the input item order corresponding to the maximum number of levels of the hierarchical structure, and a user skips unnecessary input items.

What is claimed is:

1. A disk reproduction apparatus capable of accommodating a plurality of disks in disk mount areas and randomly accessing any track in any disk in the disk mount areas, said apparatus comprising:

means for discriminating whether a track corresponding to a disk number entered by a user is a track of a first type of disk or a second type of disk, and when the track is discriminated to be a track of the second type disk, for further discriminating what is a sub-type of the second type disk;

means for requesting the user to enter a track number immediately after entering the disk number, when the discriminated track is a track of the first type of disk; and means for requesting the user to enter a group number in a distinct entering form corresponding to the discriminated sub-type of the second type disk and then requesting to enter a track number after the group number is entered, when the discriminated track is a track of the second type disk.

2. A method for use in a disk reproduction apparatus having a plurality of disk mount areas each accommodating a disk designated by a disk number corresponding to the disk mount area, a plurality type of disks being accommodated in the disk mount areas, each disk having a reproduction designation unit which is a minimum unit capable of being randomly accessed in response to a reproduction instruction, a method of designating the reproduction designation unit of each disk being different for each disk type, each reproduction designation unit being able to be reproduced by randomly accessing the reproduction designation unit of each disk accommodated in the disk mount area, the method comprising the steps of:

requiring a user to designate a predetermined reproduction designation unit of a predetermined disk;

identifying a disk type of the predetermined disk corresponding to a disk number designated by the user;

identifying a sub-type of the disk with the identified specific disk type; and requiring the user to enter data in a distinct entering form and a distinct input item order corresponding to the disk type and its sub-type.

3. The method according to claim 2, wherein the step of requiring the user to enter data includes causing the user to enter the data in a predetermined order which is related to a hierarchical structure for storing the reproduction designation unit of each disk.

4. The method according to claim 2 or 3, wherein the step of requiring the user to enter the data includes causing the user to enter the data in an order of an item name of a hierarchical structure of each disk.

5. The method according to claim 3, wherein if the disk type cannot be identified, the user is requested to input data in the input item order corresponding to the hierarchical structure of a disk having the maximum number of levels of the hierarchical structure.

6. The method according to claim 3, wherein the hierarchical structure of each disk is detected from management information which is first read from the disk, and the read hierarchical structure is stored.

7. The method according to claim 6, wherein the stored hierarchical structure of each disk is erased when the disk together with the disk mount area accommodating the disk is exposed.

8. The method according to claim 2, when a user designates a predetermined reproduction designation unit of a predetermined disk, the user designates the reproduction designation unit that is used to register a program reproduction.

* * * * *